(12) United States Patent
Czopek et al.

(10) Patent No.: US 8,215,686 B2
(45) Date of Patent: Jul. 10, 2012

(54) FASCIA ENERGY ABSORBER, BUMPER SYSTEM AND PROCESS

(75) Inventors: Brian Joseph Czopek, Macomb Township, MI (US); Eric Jon Jaarda, Milan, MI (US); Eric D. Kawal, Macomb, MI (US)

(73) Assignee: Sabic Innovative Plastics IP B.V. (NL)

(*) Notice: Subject to any disclaimer, the term of this patent is extended or adjusted under 35 U.S.C. 154(b) by 0 days.

(21) Appl. No.: 11/967,626

(22) Filed: Dec. 31, 2007

(65) Prior Publication Data
US 2009/0167037 A1    Jul. 2, 2009

(51) Int. Cl.
*B60R 19/26* (2006.01)
(52) U.S. Cl. .................................... 293/133
(58) Field of Classification Search ............ 293/133, 293/132, 135, 136
See application file for complete search history.

(56) References Cited

U.S. PATENT DOCUMENTS

| | | | |
|---|---|---|---|
| 3,897,095 A | 7/1975 | Glance et al. | |
| 3,933,387 A * | 1/1976 | Salloum et al. | 293/120 |
| 4,569,865 A * | 2/1986 | Placek | 428/31 |
| 4,951,986 A | 8/1990 | Hanafusa et al. | |
| 5,988,713 A | 11/1999 | Okamura et al. | |
| 6,082,792 A | 7/2000 | Evans et al. | |
| 6,099,055 A | 8/2000 | Hirota et al. | |
| 6,299,226 B1 | 10/2001 | Kroning et al. | |
| 6,334,638 B1 | 1/2002 | Yamamuro et al. | |
| 6,736,434 B2 * | 5/2004 | Anderson et al. | 293/102 |
| 6,818,305 B2 * | 11/2004 | Murar et al. | 428/412 |
| 6,938,936 B2 * | 9/2005 | Mooijman et al. | 293/120 |
| 7,165,794 B2 * | 1/2007 | Banry et al. | 293/133 |
| 7,222,897 B2 * | 5/2007 | Evans et al. | 293/120 |
| 2003/0211311 A1 * | 11/2003 | Porter et al. | 428/318.8 |
| 2004/0036302 A1 | 2/2004 | Shuler et al. | |
| 2004/0094977 A1 | 5/2004 | Shuler et al. | |
| 2004/0174025 A1 * | 9/2004 | Converse et al. | 293/133 |

(Continued)

FOREIGN PATENT DOCUMENTS

FR 2903358 A1 1/2008

(Continued)

OTHER PUBLICATIONS

French Patent No. 2903358; Publication Date: Jan. 11, 2008; Machine Translation; 25 Pages.

(Continued)

*Primary Examiner* — H Gutman
(74) *Attorney, Agent, or Firm* — Cantor Colburn LLP

(57) ABSTRACT

The present invention provides for various embodiments of a unitary fascia energy absorber including an aesthetic appearance while also providing improved energy management. In one embodiment the fascia energy absorber includes an outer member and an inner member joined together. The inner member has a base including a plurality of crush lobes and at least one of the plurality of crush lobes includes a projected wall spaced a distance from the base and at least one sidewall which extends from the base to the projected wall of the crush lobe. The plurality of crush lobes are spaced apart from one another and separated by a portion of the base. In another embodiment a process for producing a fascia energy absorber includes heating and forming a polymer sheets to form an outer member and heating and forming a second polymer sheet to form an inner member. The inner member and the outer member are then joined to form a fascia energy absorber.

34 Claims, 7 Drawing Sheets

U.S. PATENT DOCUMENTS

| | | |
|---|---|---|
| 2005/0017520 A1 | 1/2005 | Evans et al. |
| 2005/0057053 A1* | 3/2005 | Evans et al. ............... 293/133 |
| 2005/0087997 A1* | 4/2005 | Zander et al. ............... 293/102 |
| 2005/0087999 A1 | 4/2005 | Campbell et al. |
| 2005/0089674 A1* | 4/2005 | Zander et al. ............... 428/158 |
| 2005/0127718 A1 | 6/2005 | Cormier et al. |
| 2006/0051569 A1* | 3/2006 | Porter et al. ............... 428/318.8 |
| 2006/0284431 A1* | 12/2006 | Evans et al. ............... 293/121 |
| 2007/0108778 A1* | 5/2007 | Evans et al. ............... 293/120 |
| 2007/0284896 A1* | 12/2007 | Wakabayashi et al. ....... 293/120 |

FOREIGN PATENT DOCUMENTS

| | | |
|---|---|---|
| GB | 2134858 A | 8/1984 |
| JP | 6107092 A | 4/1994 |
| JP | 6247237 A | 9/1994 |
| JP | 11192905 A | 7/1999 |
| WO | 2005012043 A1 | 2/2005 |
| WO | 2009006142 A1 | 1/2009 |

OTHER PUBLICATIONS

Japanese Patent No. 6107092; Publication Date: Apr. 19, 1994; Abstract Only; 1 Page.

Japanese Patent No. 6247237; Publication Date: Sep. 6, 1994; Abstract Only; 1 Page.

Japanese Patent No. 11192905; Publication Date: Jul. 21, 1999; Abstract Only; 1 Page.

* cited by examiner

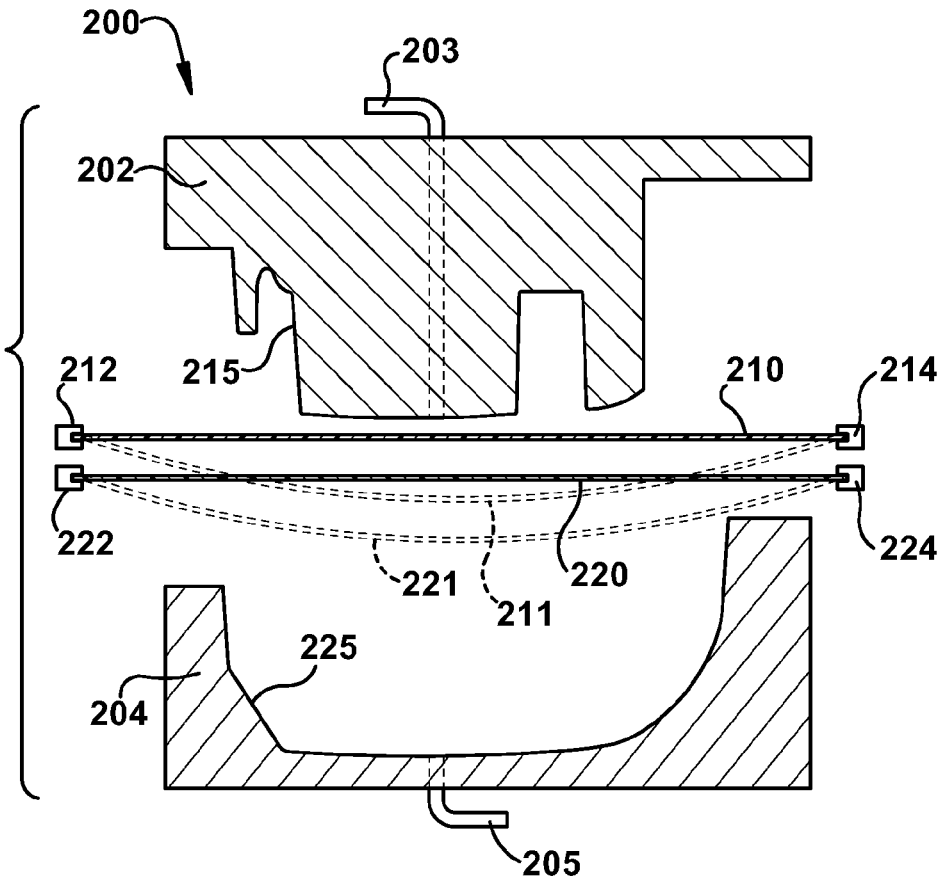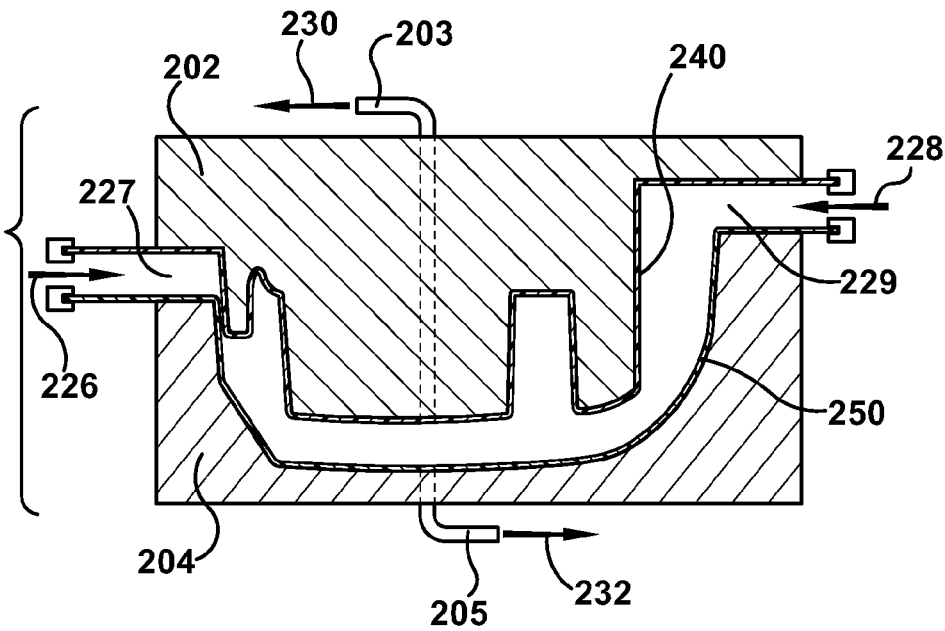

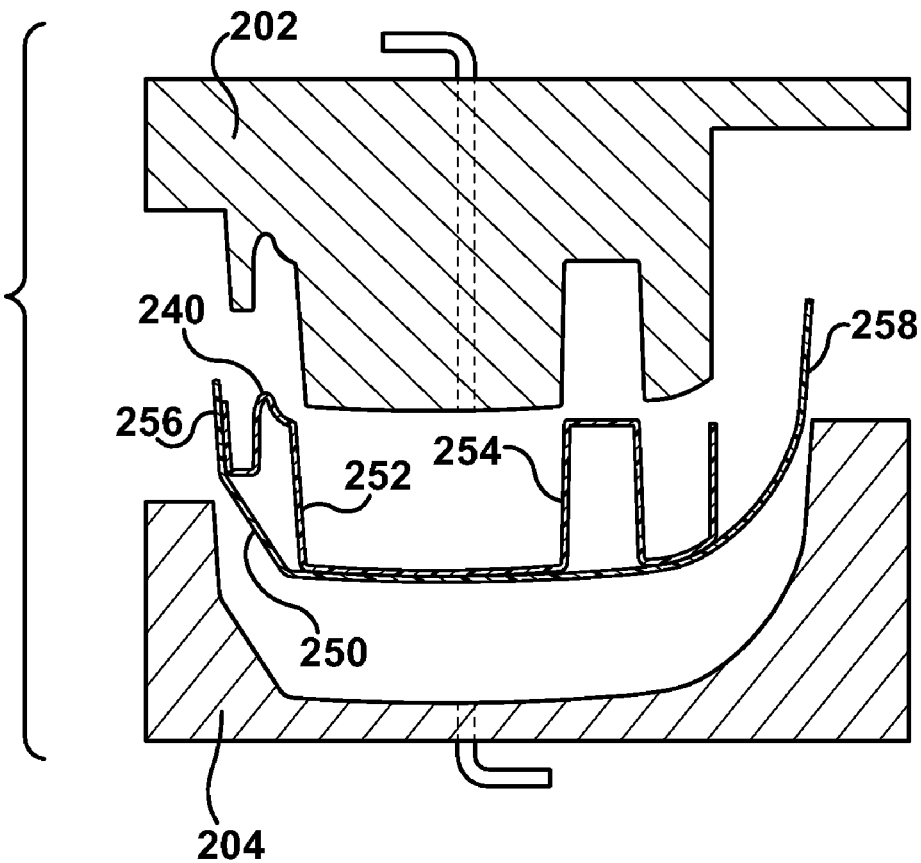
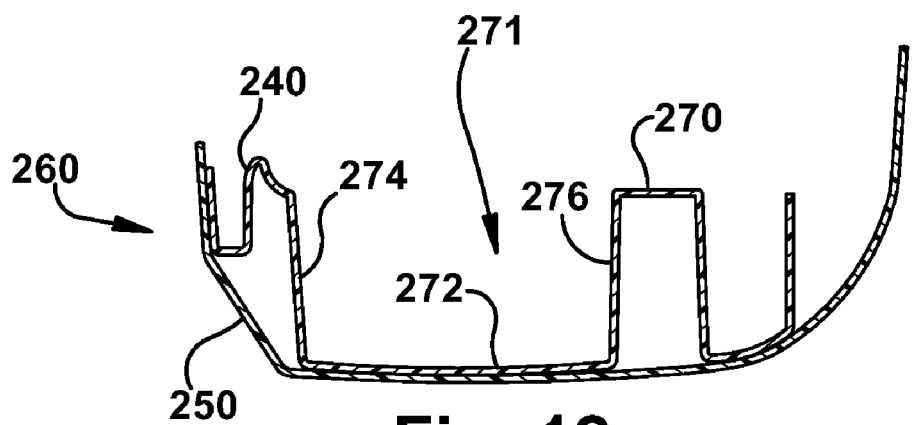

FASCIA ENERGY ABSORBER, BUMPER SYSTEM AND PROCESS

FIELD OF THE INVENTION

The present invention relates to an energy absorber for use in a bumper system and the process of making the energy absorber. More specifically, the present invention relates to a unitary fascia energy absorber for absorption of impact in a bumper system for the exterior of vehicles and a process of making the fascia energy absorber.

BACKGROUND OF THE INVENTION

The use of structures for absorbing energy in vehicles is known. Bumper systems typically extend widthwise, or transverse, across the front and rear of a vehicle and are mounted to rails that extend in a lengthwise direction. Many bumper assemblies for an automotive vehicle include a bumper beam and an injection molded energy absorber secured to the bumper beam. The bumper system generally further includes an energy absorber along the surface of the bumper and also a fascia for covering the energy absorber.

Beneficial energy absorbing bumper systems achieve high efficiency by building load quickly to just under the load limit of the rails and maintain that load constant until the impact energy has been dissipated. Energy absorbing systems attempt to reduce vehicle damage as a result of a collision by managing impact energy absorption. Bumper system impact requirements are set forth by United States Federal Motor Vehicle Safety Standards (US FMVSS), Canadian Motor Vehicle Safety Standards (CMVSS), European EC E42 consumer legislation, EuroNCAP pedestrian protection requirements, Allianz impact requirements and Asian Pedestrian Protection for lower and upper legs. In addition, the Insurance Institute for Higher Safety (IIHS) has developed different barrier test protocols on both front and rear bumper systems. These requirements must be met for the various design criteria set forth for each of the various automotive platforms and car models.

Past vehicle design trends called for streamlined fascias for a given vehicle platform and designs provided plenty of space between the fascia and the bumper beam for design of effective energy absorbers. However, current trends in bumper system designs allow consumers to have substantially more customized options. That is, for example, different styles of fascias are being designed for many more car models. The design of unique fascias results in relatively low volume manufacturing for each specific car build and tooling costs for injection molding the parts become prohibitive.

Another problem is that current designs have less space, or packaging space, in which energy absorbers can effectively meet the impact and safety requirements. Known energy absorber structures include, for example, foamed plastic materials, plastic ribbed structures, such as polypropylene honeycomb, and deformable hollow bodies. These current structures are expensive and/or do not meet the performance requirements.

SUMMARY OF THE INVENTION

The present invention, according to an embodiment of the present invention provides for a unitary fascia energy absorber including an outer member and an inner member joined together. In one embodiment, the inner member includes a base including a plurality of crush lobes. Each of the plurality of crush lobes includes a projected wall spaced a distance from the base and at least one sidewall which extends from the base to the projected wall of the crush lobe. The plurality of crush lobes are spaced apart from one another and separated by a portion of the base. The unitary structure allows for more efficient use of space while managing energy. Also, engineering thermoplastics and the superior physical properties inherent in them can provide for better impact performances at lower wall thicknesses.

In another embodiment the fascia energy absorber includes a thermoformed outer member that is joined to a thermoformed inner member. The inner member includes a base and a plurality of crush lobes and at least one of the crush lobes has a projected wall which is spaced a distance from the base and includes at least one sidewall which extends from the base to the projected wall. The thickness of the sidewall has a thickness that is at least as great as 60% the thickness of the base near the sidewall.

In another embodiment of the present invention, a process for making a fascia energy absorber includes the steps of: heating a polymer sheet and forming the polymer sheet to produce an inner member; heating a second polymer sheet and forming the second polymer sheet to produce an outer member; and joining the inner member and the outer members. The thermoformed fascia energy absorber allows for lower tooling costs, which yields greater opportunity for customized styling of the fascia.

BRIEF DESCRIPTION OF THE DRAWINGS

The various embodiments of the present invention can be understood by the following drawings and figures. The components are not necessarily to scale.

FIG. 9 through FIG. 12 are schematic illustrations of steps of a process for making the fascia energy absorber of FIGS. 1 and 2, according to an embodiment of the present invention.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of." Furthermore, all ranges disclosed herein are inclusive of the endpoints and are independently combinable.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases. In at least some instances, the approximating language may correspond to the precision of an instrument for measuring the value.

The term "plurality" as used herein refers to a quantity of two or more.

The term "multi-layer" as used herein refers to at least two layers.

Figure 1:
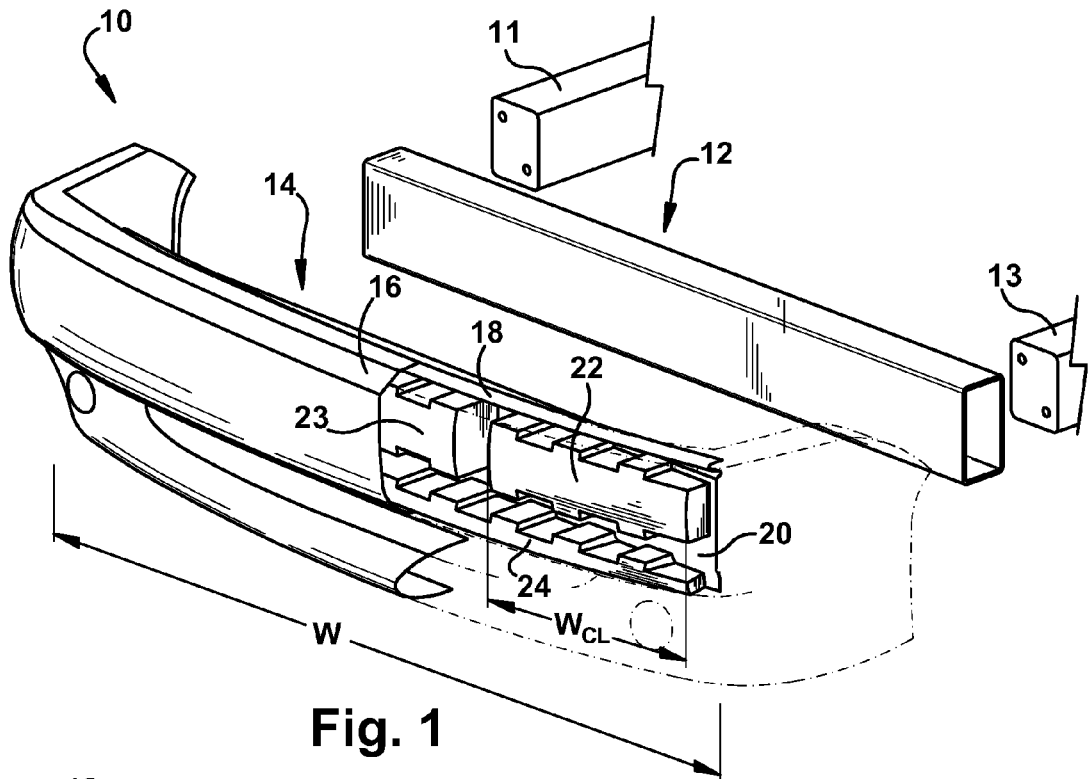
FIG. 1 is an exploded perspective view of a bumper system which includes a fascia energy absorber and a bumper beam, according to an embodiment of the present invention.

FIG. 1 is a schematic exploded view of a bumper system 10 which can be connected to a vehicle, such as for example, side rails 11 and 13 that extend longitudinally along an automobile. Bumper system 10 includes bumper beam 12, and a fascia energy absorber 14, which attaches to the bumper beam 12 according to an embodiment of the invention. It is understood that those skilled in the art that the bumper beam 12 can be made of high-strength material, such as aluminum, a composite with thermal plastic resin, for example. Fascia energy absorber 14 can be made from one or more of a variety of polymers and blends, as will be further described. Fascia energy absorber 14 includes outer member 16 which at least partially or fully envelopes the inner member 18. Inner member 18 includes a base 20 and a plurality of crush lobes, for example crush lobes 22, 23 and 24 which project from base 20. As shown in the example embodiment of FIG. 1, each of the plurality of crush lobes, for example crush lobe 22 has a width, $W_{CL}$, which can range from a portion of the transverse width, W, of the inner member 18, to the entire transverse width, W, such as for example crush lobe 24 which extends along substantially the entire transverse width of the inner member 18 and fascia energy absorber 14.

Figure 2:
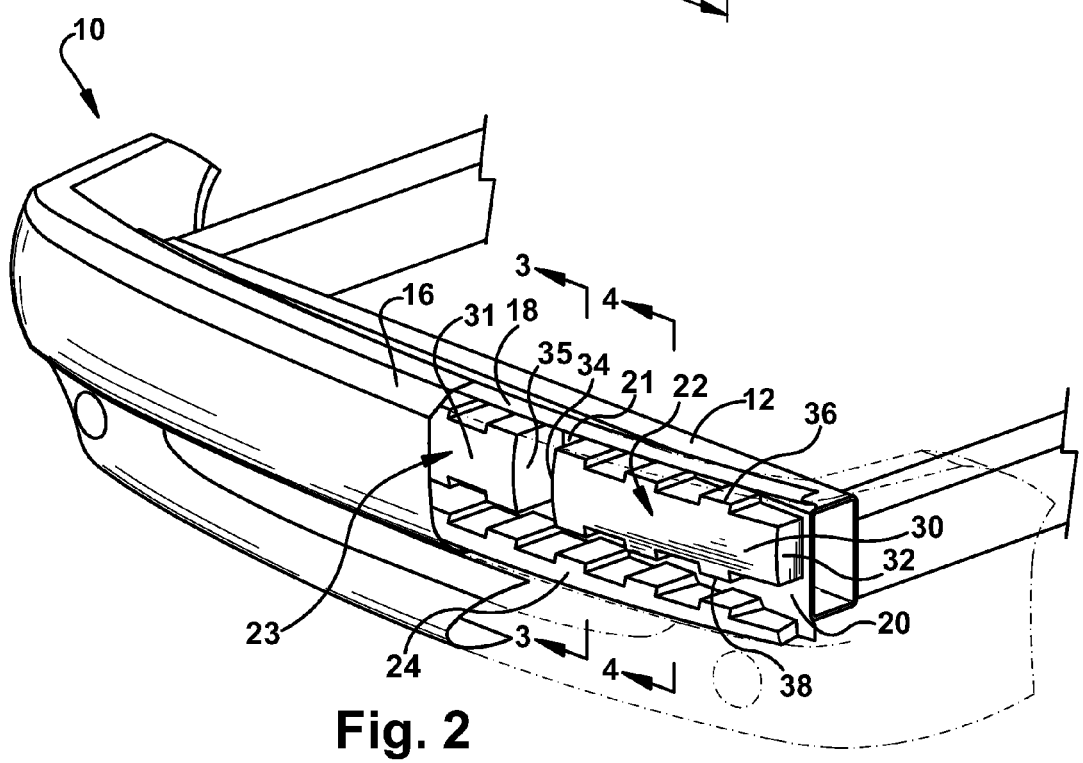
FIG. 2 is a perspective cut-away view showing the fascia energy absorber of the bumper system of FIG. 1 and mounted to vehicle side rails, according to an embodiment of the present invention.

FIG. 2 illustrates a cut-away view of fascia energy absorber 14 attached to bumper beam 12 of bumper system 10 attached to side rails 11 and 13. In one embodiment, at least one of the plurality of crush lobes of inner member 18 includes a base, a projected wall spaced apart from the base and at least one sidewall which extends between the base and the projected wall. For example, crush lobe 22 has a projected wall 30 and at least one sidewall such as first side wall 32, second side wall 34, upper wall 36 and lower wall 38 which extend from base 20 to projected wall 30. A base portion 21 of base 20, or "strap" separates crush lobe 22 from crush lobe 23 between sidewalls 34 and 35, respectively. Crush lobes 22 and 23 are shown having corrugated upper wall 36 and lower wall 38; however, alternative surface patterns are contemplated as well as planar upper and lower surfaces. The outer member 16 can optionally include an opening or air duct to allow air flow through the fascia energy absorber 14 into the radiator of an automobile, for example.

Figure 3:
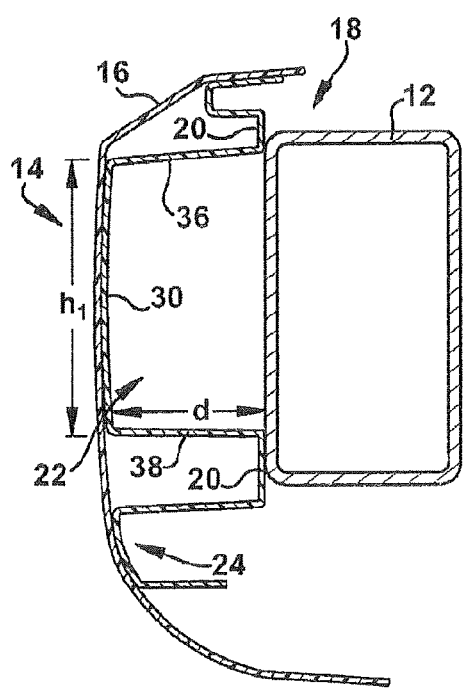
FIG. 3 is a cross-sectional view taken along lines 3-3 of the bumper system of FIG. 2, according to an embodiment of the present invention.

FIG. 3 is a cross-sectional view taken along lines 3-3 of bumper system 10 of FIG. 2. Fascia energy absorber 14 has an outer member 16 that is at least partially curved and substantially envelopes inner member 18 that contacts bumper beam 12. Fascia energy absorber 14 is orientated in a "C-shape" configuration such that base 20 contacts bumper beam 12 and projected wall 30 of crush lobe 22 contacts outer member 16. The cross-section is taken at a location of the corrugation in which crush lobe 22 has a height, h1 and which is less than height of the bumper beam 12. Crush lobe 22 of inner member 18 projects a depth, d, toward the inner member 18 and projected surface 30 contacts the outer member 16. Base 20 separates crush lobe 22 and crush lobe 24 that extends beneath bumper beam 12. The depth, d, of crush lobe 22 and all other crush lobes described herein can range from about 25 to 75 millimeters, in another example from about 30 to about 65 millimeters, and in another embodiment from about 35 to about 50 millimeters.

Figure 4:
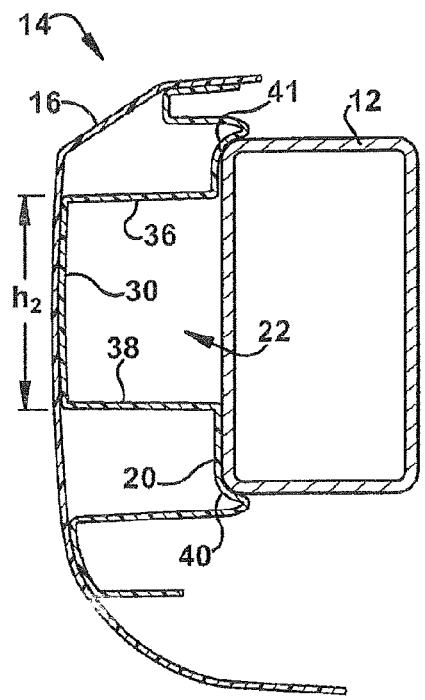
FIG. 4 is a cross-sectional view taken along lines 4-4 of the bumper system of FIG. 2, according to an embodiment of the present invention.

FIG. 4 is a cross-sectional view taken along 4-4 of the bumper system 10 of FIG. 2. Cross section taken along a different location of a corrugated crush lobe 22 than shown in FIG. 3 has a height, $h_2$ which is less than height $h_1$. Whereas base 20 is substantially planar at the location of contact with beam 12 in FIG. 3, in an alternative embodiment base 20 can include contoured surfaces 40 and 41 which generally conform to the profile shape of bumper beam 12. In this manner the fascia energy absorber 14 is biased against the bumper beam 12 in at least two directions. Contoured surfaces 40 and 41 can provide more resistance against the upper and lower walls 36, 38, in a direction which helps prevent them from spreading further apart when the bumper system is impacted. When load is applied to the fascia energy absorber having a substantially planar base portion 20 against bumper beam 12 in FIG. 3, the base portion slides along the bumper beam and the absorbed energy can offer a relatively low resistance. However, in FIG. 4 both contact ends of the base are engaged with the bumper beam 12 such that the elements bend toward the bumper beam. The strain caused by the bending offers a higher resistance to intrusion by the object or impactor.

Figure 5:
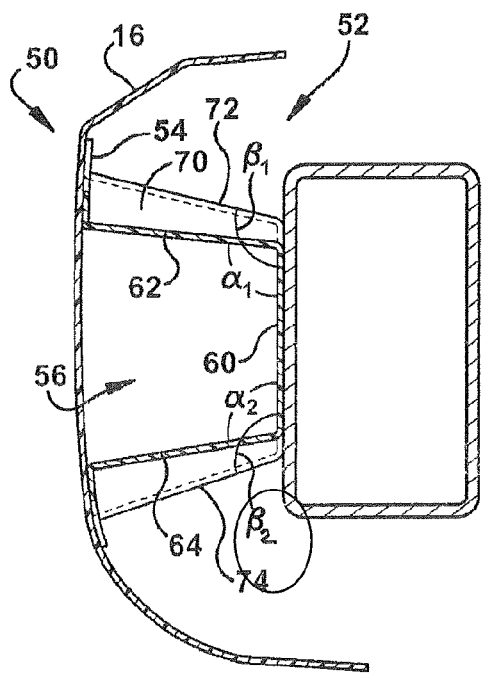
FIG. 5 is a cross-sectional view of a bumper system showing an alternative fascia energy absorber including an inner member and an outer member, according to an embodiment of the present invention.

In an alternative embodiment of the present invention, FIG. 5 shows a cross-sectional view of fascia energy absorber 50 in which the inner member and outer member can cooperate to form a closed "box-like" cross-section against the bumper beam 12. Fascia energy absorber 50 includes inner member 52 and outer member 16 joined to one another and which abuts and/or attaches to bumper beam 12. Inner member 52 includes base 54 and crush lobe 56 which extends from base toward bumper beam 12. Crush lobe 56 includes a projected wall 60 and upper and lower walls 62 and 64, respectively, which extend between base 54 and projected wall 60. Projected wall 60 contacts bumper beam 12 and base 54 contacts outer member 16 and provides a surface which distributes a load upon impact to fascia energy absorber 50. The box-like structure formed by the crush lobe 56 in conjunction with outer member 16 provide increased resistance to impact upon bumper system 10.

Each of the upper and lower walls 62 and 64, respectively, which extend between the projected surface 60 and outer member 16 are shown oriented at angles, $\alpha_1$ and $\alpha_2$, relative to projected wall 60 where the angles can range from about 90 degrees to 135 degrees, in another embodiment from slightly greater than about 90 degrees to about 110 degrees relative to projected wall 60. Angles, $\alpha_1$ and $\alpha_2$, can be the same or different. Likewise, the angles which separate sidewalls and projected wall of the crush lobes described above in FIGS. 3 and 4 and those described throughout the various embodiments described herein can be oriented at an angle, for example $\alpha_1$ and $\alpha_2$ relative to the projected wall of the crush lobe. Therefore, the sidewalls of the crush lobes of the inner members can be tapered for ease of removal from the tool by which it is formed.

Figure 6:
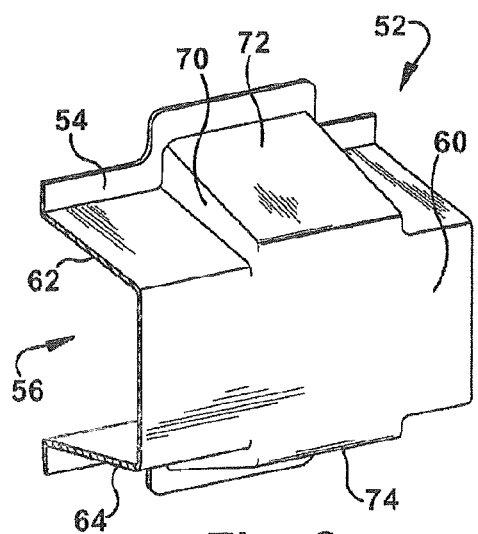
FIG. 6 is a perspective view of the fascia energy absorber shown in FIG. 5, according to an embodiment of the present invention.

FIG. 6 shows a perspective view of inner member 52 of fascia energy absorber 50 that is a clearer view of corrugated upper wall 62 and lower wall 64. Crush lobe 56 has an extended portion 70 of upper wall 62. The upper and lower walls 72 and 74, respectively, of extended portion 70 are oriented at angles, $\beta_1$ and $\beta_2$, relative to projected wall 60 where the angles can be the same or different from each other, and can be the same or different from angles $\alpha_1$ and $\alpha_2$, and can vary for example within the ranges described with respect to angles $\alpha_1$ and $\alpha_2$.

Figure 7:
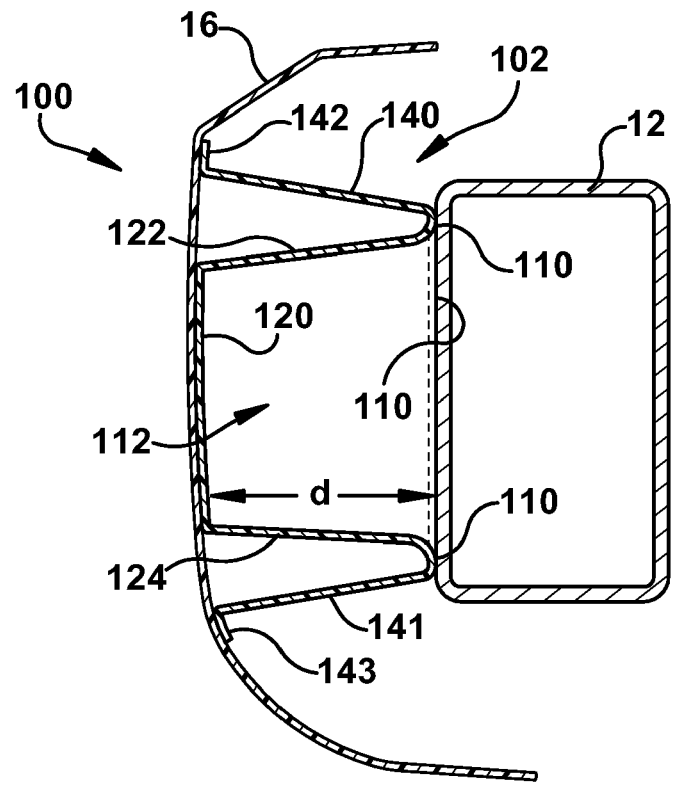
FIG. 7 is a cross-sectional view of an alternative fascia energy absorber, according to an embodiment of the present invention.
Figure 8:
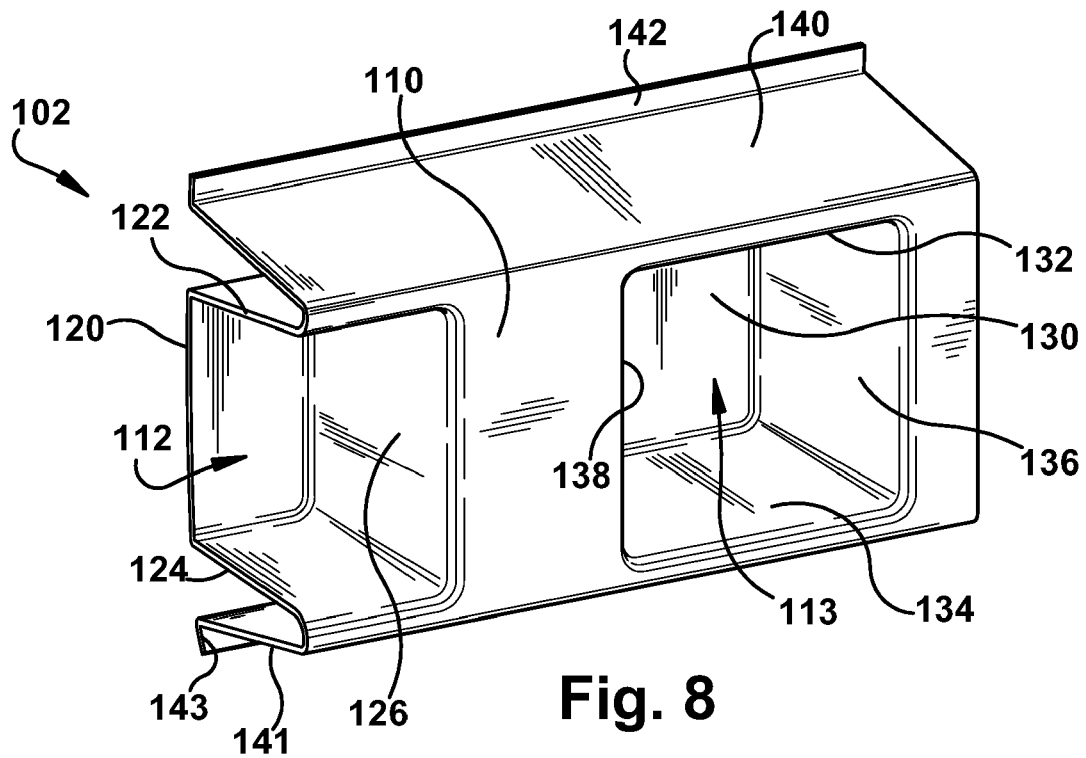
FIG. 8 is a perspective view of the fascia energy absorber shown in FIG. 7, according to another embodiment of the present invention.

FIG. 7 is a cross-sectional view of fascia energy absorber 100 mounted to bumper beam 12, according to another embodiment of the present invention. Fascia energy absorber 100 includes outer member 16 and inner member 102. A perspective view of inner member 102 shown in FIG. 8 illustrates base 110 and crush lobes 112 and 113. Crush lobe 112 has projected wall 120 which is spaced a distance, d, from base 110 and upper wall 122, lower wall 124 and side walls 136 and 138. Projected wall 120 is shown in contact with outer member 16 and base 110 contacts bumper beam 12. In addition, inner member 102 has a second set of sidewalls 140 and 141 which extend from base 110 and terminate at flanges 142 and 143, respectively, which contact outer member 16. Therefore, additional sidewalls 140 and 141 have a length that is substantially equal to the depth, d, of crush lobes 112 and 113 that extend between bumper beam 12 and outer member 16.

As shown in FIGS. 7 and 8, the projected walls 120 and 130 of crush lobes 112 and 113, respectively, as well as flanges 142 and 143 of outer walls 140 and 141 directly contact outer member 16, in an alternative embodiment, the projected walls 120 and 130 of crush lobe 112 and 113 and flanges 142 and 143 can contact bumper beam 12. In any of the embodiments, the crush lobes of inner member 102, in combination with either outer member 16 or bumper beam 12, form enclosed structures that allow upper walls 122 and lower wall 124, outer walls 140 and 141, and sidewalls 136 and 138 to collapse in a controlled manner for effective energy management.

The cross-sectional views show the design flexibility in the various profile shapes of the inner member can affect the tuning of the fascia energy absorber. In addition, the fascia energy absorber can be tuned by varying the depth and thickness of the crush lobes of the inner member and the wall thickness of the outer member, for example. Wall thicknesses of the inner member and outer member can be the same or different, and may vary along the transverse width, W, of fascia energy absorber. For example, an inner member may be thinner in locations along the transverse width, $W_{CL}$, of a crush lobe where the depth, d, is greater.

The average thicknesses of the inner and outer members can vary depending upon the selected characteristics of the fascia energy absorber. The average thickness of each of the inner member and outer member can range from about 0.1 millimeters to 10 millimeters, in an alternative embodiment, from about 1 millimeter to about 7 millimeters, and in yet another embodiment from about 2 millimeters to about 5 millimeters, and all subranges therebetween.

The inner member and the outer member of the fascia energy absorber may have a thickness composed of multi-layers of different materials. For example, outer member may have a substrate layer and a coating layer, for example a polymer or paint coating which can provide Class A surface to the fascia energy absorber. The outer layer, for example can also include a top coat layer and/or one or more intermediate layers. In such case the average thickness of each of the various layers can range as indicated above, and/or may be thinner, for example, thin layers ranging from about 0.05 millimeter to about 5 millimeters, in another example, from about 0.1 millimeter to about 1.5 millimeter, and in yet another example, from about 0.2 millimeter to about 1 millimeter, and all subranges therebetween.

As mentioned above, portions of each of the inner member and outer member can be tuned by thinning of the various walls of the crush lobes. For example the inner member which has crush lobes which emanate from the base can under go up to about 60% thinning relative to the thickness of the base, depending upon the depth of the crush lobes and the various processing methods as will be further described. In one embodiment the at least one sidewall which extends from the base to the projected wall has an average thickness which is at least as great as 50% of the thickness of the base, in another embodiment, at least as great as 60% of the thickness of the base, in another embodiment from about 60% to about 99% of the thickness of the base, and in another embodiment from about 70% to about 90% the thickness of the base.

Another aspect in appropriately tuning the energy absorber of the embodiments described above is the selection of the thermoplastic resin to be employed. The outer member and the inner member of the fascia energy absorbers herein can be made of the same or different material or polymer compositions. Two material or polymer compositions can be different if their molecular structures are different, their additives are different, or both, where additives include, but are not limited to, fillers, colorants, components which enhance processing and properties, for example. Also, as mentioned, each of the inner member and outer member may be made of two or more different material compositions.

Fascia energy absorber can be made from a non-reinforced polymer, and can be made from any suitable thermoplastic polymer, thermoset polymer, and mixtures thereof. In addition, fillers or other suitable additives may be added to the polymer material to strengthen or provide elasticity to the outer member and/or the inner member of the fascia energy absorber. The resin employed may be a low modulus, medium modulus or high modulus material as needed. By carefully considering each of these variables, energy absorbers meeting the selected energy impact objectives can be manufactured. The characteristics of the material utilized to form the energy absorber include high toughness/ductility, thermally stable, high-energy absorption capacity, a good modulus-to-elongation ratio and recyclability, among other physical properties, for example.

In any of the embodiments described above, material compositions of the outer member and the inner member can be the same or different from one another. The outer member and inner member can be made from non-reinforced polymer, for example, a polymer impregnated with long-glass fiber that is then thermoformed. The outer member and the inner member can be made from any suitable thermoplastic or thermoset material. In addition, fillers or other additives may be added to the polymer to strengthen the fascia energy absorber. Suitable fillers may include fillers such as glass fiber or plastic fiber, for example. Material compositions can include, but are not limited to, polyesters, polycarbonates, polycarbonate-based copolymers; polyesters, such as, for example, amorphous polyester terephthalate (APET), poly(ethylene terephthalate) (PET), poly(propylene terephthalate), poly(butylenes terephthalate) (PBT), poly(cyclohexane dimethanol cyclohexane dicarboxylate), and glycol-modified polyethylene terepthalate (PETG); polyvinylchloride (PVC); polysulfones, including polyethersulfone (PES), and polyphenylsulfone (PPSU); poly(vinyl acetate); polyarylates; polyetherimide (PEI); polyimide; polyamide; polyestercarbonates; polyetherketone, polyurethanes, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, blends of polyphenylene ether/polyamide, blends of polycarbonate/PET/PBT, polybutylene terephthalate, phenylene sulfide resins, polyvinyl chloride PVC, high impact polystyrene (HIPS), low/high density polyethylene (LDPE, HDPE), polypropylene (PP) and thermoplastic olefins (TPO), polyether imides (PEI), and blends thereof.

FIGS. 9 through 12 are schematic illustrations of steps of a process for making fascia energy absorbers, for example fascia energy absorbers 14, 50 and 100 described above in FIGS. 1 through 8, in accordance with an embodiment of the present invention. The process for making the fascia energy absorber according to one embodiment includes heating a first polymer sheet and forming the polymer to produce an inner member; heating a second polymer sheet and forming the polymer to produce an outer member; joining the outer member and the inner member to produce a fascia energy absorber. Twin sheet thermoforming is one example of a process that can provide high productivity because two members of the final product, for example the outer member and the inner member, are formed simultaneously within the same thermoforming apparatus. By "simultaneously" it is meant that at least a portion of the forming process is carried out at the same time for each of the members. In an alternative process, each of the members, for example the outer member and the inner member can be formed separately, either at different times or in a separate molding apparatus, or both.

FIG. 9 shows a cross-sectional view of thermoforming apparatus 200 having tooling which includes a male mold "core" 202 having core surface 215 and a female mold "cavity" 204 having a cavity surface 225. Male mold core 202 and female die cavity 204 typically include vent ports 203 and 205, respectively, for vacuuming out gases, such as air, during the thermoforming process. Thermoforming apparatus 200 further includes clamps 212 and 214 that secure a first polymer sheet 210 and clamps 222 and 224 that secure second polymer sheet 220. While the polymer sheets are secured in the clamps they are heated in an oven to an elevated temperature that depends upon the polymer to be formed. For example the polymer can be heated to a temperature that is within about 50° F., in another example about 25° F., and in another example within about 10° F. of the heat deflection temperature (HTD) or melt temperature of the polymer.

In another embodiment, the process optionally includes stretching the polymer sheets 210, 220 prior to and/or during the forming step. The polymer can be stretched, for example by gravity, in which the sheets 210 and 220 sag as shown by the dotted lines 211 and 221 prior to contacting the tooling. In this step the polymer is stretched to a substantially uniform wall thickness thereby minimizing the variation of the wall thickness in the final product. In another embodiment, the process can further include "articulating" the polymer to move edges of sheet secured by the clamps to a predetermined contour pattern. For example, clamps 222 and 224 can have articulating joints that contact the polymer sheet in several locations. The articulating joints can rotate to pre-shape the polymer sheet in close conformity to the selected shape of the final product, for example, the contour of the female die cavity 225. As shown, female mold cavity 204 has a C-shaped contour for the selected shape of outer member 16 (FIG. 3) of the fascia energy absorber 14 and mold clamps 222 and 224 can rotate to bend polymer sheet 220 in a C-shaped configuration prior to placing the polymer into contact with the mold cavity 204.

FIG. 10 shows the apparatus 200 when the first polymer sheet 210 and second polymer sheet 220 conforms substantially to the core surface of 215 to male mold core 202 and is a formed inner member 240, and polymer sheet 220 conforms substantially to mold surface 225 of female mold cavity 204 and is a formed outer member 250. During the thermoforming process a gas, such as air, is directed between the male mold core and female mold cavity in a direction indicated by arrows 226 and 228 through gap 227 and 229 that forms between the tool. Optionally, a vacuum pulls the gas through vacuum ports 203 and 205 and out of the male and female mold portions in direction indicated by arrows 230 and 232. Inner member 240 and outer member 250 which remain at an elevated temperature can be joined by coming into contact with one another and joined to form a fascia energy absorber that is similar to fascia energy absorber 14 of the FIGS. 1-3. FIG. 11 shows the male mold core 202 and female mold cavity 204 are moved farther apart from one another so that the resulting fascia energy absorber 260 can be ejected or removed from the mold apparatus 200. The walls of the inner member, for example walls 252, 254, and outer members, for example walls 256, 258, can be tapered for ease of removal for each action from the core and the mold cavities. FIG. 12 shows resulting fascia energy absorber 260 includes outer member 250 and inner member 240. The inner member 240 includes base 270 and at least one crush lobe, for example crush lobe 271 having projected wall 272 that contacts outer member 250 and side walls 274 and 276 which extend from base 270 to the projected wall 272.

Therefore, in the embodiment described in steps illustrated in FIGS. 9-12, a first polymer sheet is formed onto a male mold core of a tool to produce an inner member 240 having an external surface; the second polymer sheet is formed onto a female mold cavity of the tool to produce an outer member 250 having an internal surface; and the external surface of the inner member is joined to the internal surface of the outer member to produce fascia energy absorber 260. The cross-sectional illustration of FIG. 12 shows that various portions of the base and/or projected walls of the crush lobe 271 of inner member 240 is attached to outer member 250.

It should be appreciated that a variety of processes can be used to join the outer member and the inner members. In the example embodiments illustrated by the process steps of FIGS. 9-12, the molten polymers of the inner member 240 and outer member 250 allow for the materials to contact one another and adhere upon cooling. In another example, the outer member and inner member may be joined by an adhesive, a solder joint, or as another example, flanges of the outer members and inner member may include an opening through which a screw or fastener can be inserted to be attached to one another, however, the use of a fastener is not necessary. Therefore, in one example embodiment the fascia energy absorber contains no fasteners.

Figure 13:
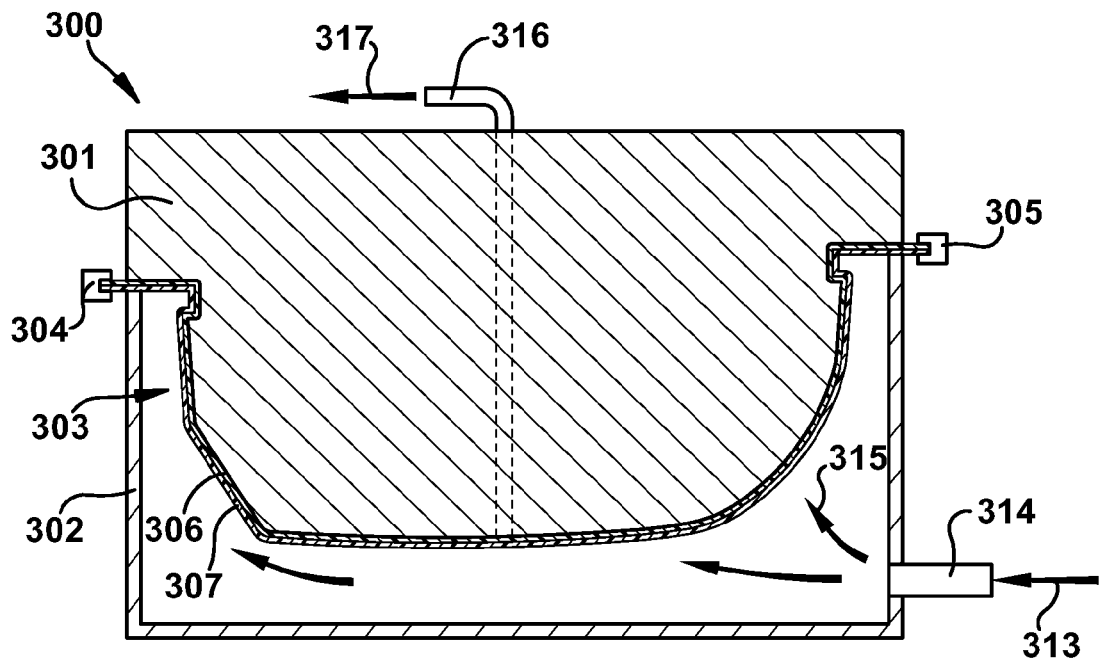
FIGS. 13 through 16 are schematic illustrations of steps of an alternative process for making a fascia energy absorber, according to an embodiment of the invention.

FIGS. 13-16 show schematic illustration of steps of a process for making fascia energy absorber according to another embodiment of the present invention. FIG. 13 shows a cross-sectional illustration of thermoforming mold apparatus 300 having a male mold core 301 that resides in a pressure box 302. Outer member 303 that includes a multi-layer of material layers 306 and 307 was formed while being held between clamps 304 and 305. Pressure box 302 is a open cavity enclosure in which gas, for example, air is blown into at a pressure that can range from about 10 to about 100 psi for example. Air can be blown through port 314 in a direction indicated 313 and the pressure forms the contours of outer member 303 against the mold surface of the core 301. Core 301 further includes a vacuum port 316 that allows gas to be vacuumed out of the core in a direction indicated by arrow 317.

Figure 14:
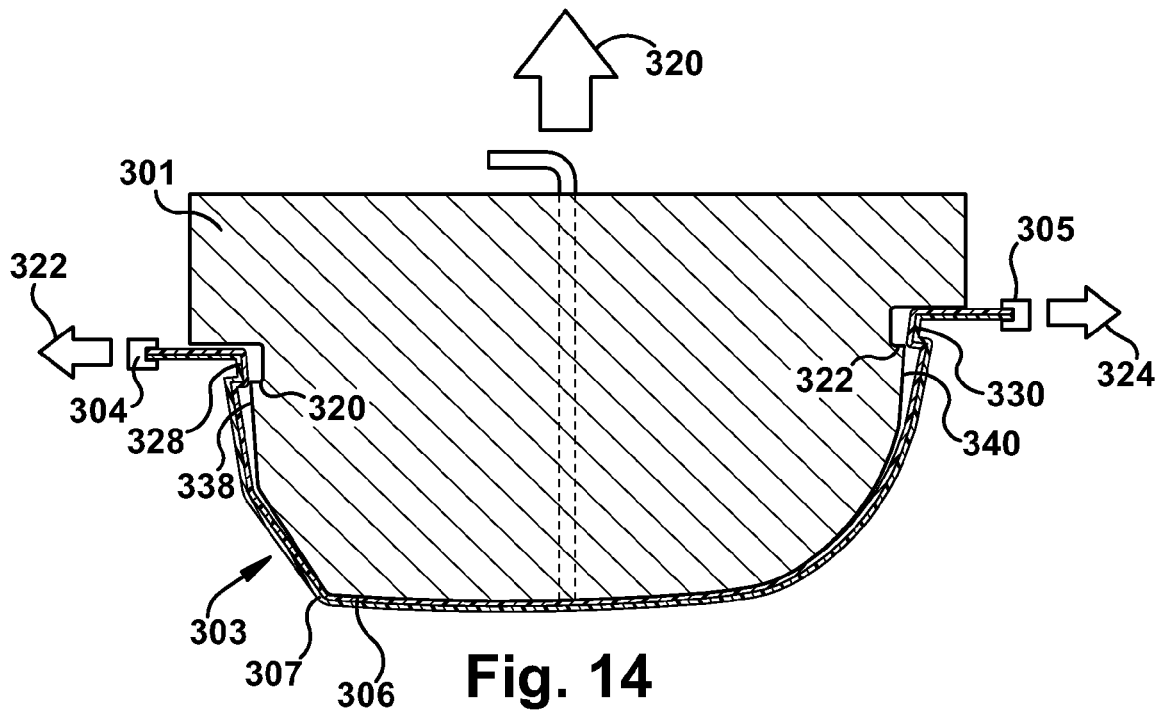

In FIG. 14, male mold core 301 is shown outside of pressure box 302, and outer member 303 conforms around shoulders 320 and 322 of male mold core. Thermoformed outer member 303 has thermoformed neck portions 328 and 330 that are narrower than the core shoulders 320 and 322 of core 301. Therefore in another embodiment of the present invention, clamps 304 and 305 pull the outer member 303 in an outward direction away from the core, so as to clear the thermoformed neck portions 328 and 330 of outer member 303 away from core shoulders 320 and 322. Once pulled the core wall portions 338 and 340 may be free to pass by the thermoformed neck portions 328 and 330 when core 301 is removed or separated from outer member 303 by movement of the core in an upward direction as indicated by arrow 320. It is beneficial that the outer member 303 is maintained at an elevated temperature, at least above room temperature, while the edges of outer member 303 are pulled away from the core 301. Therefore, in one example embodiment, the process further includes ejecting at least one of the inner member, the outer member, and pulling edges of at least one of the formed polymer sheets prior to and/or during ejection.

Figure 15:
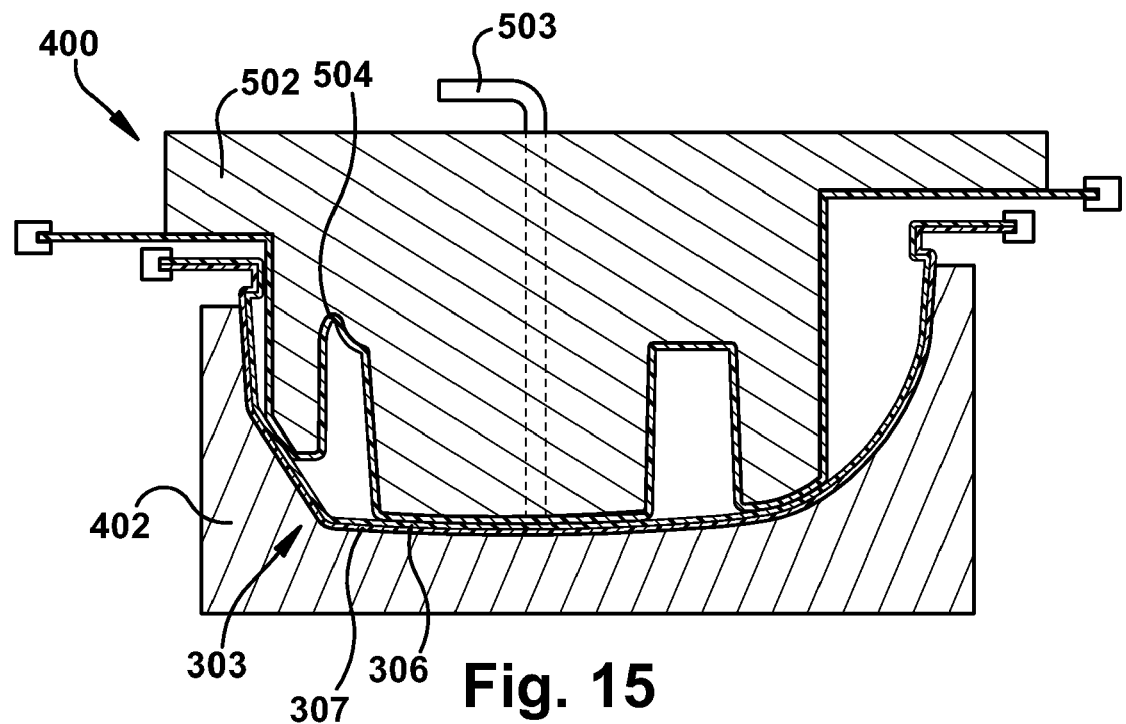

FIG. 15 is another schematic illustration of another step in the process for forming a fascia energy absorber according to an embodiment of the present invention. The formed outer member 303 once separated from the core 301 is then placed in a fixture 402 of the FIG. 15. Fixture 402 maintains the shape of the outer member and also can maintain the heat temperature of the polymer. Apparatus 400 also shows a cross-sectional schematic view of male core 502 having a polymer inner member 504 that has been shaped to conform to the geometric surface of core 502. Core 502 further includes vent port 503 that is used suctioning air from the core 502 during thermoforming of inner member 504. Inner member 504 is shaped according to a process described above with respect to outer member 303 as described in FIG. 13. Inner member 504 and outer member 303 are contacted and joined along various locations of the outer member 303 and inner member 504.

Figure 16:
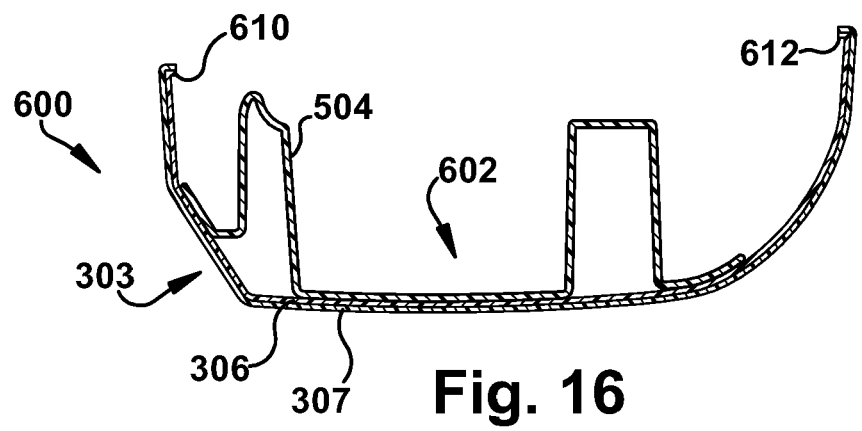

In another embodiment, the process can optionally include the step of trimming the outer member 303 and the inner member 504. FIG. 16 shows the outer member 303 and inner member 504 joined to form a fascia energy absorber 600 having undercuts, or lips, 610 and 612. Inwardly protruding lips 610 and 612 of outer member 303 can provide esthetic edges to fascia energy absorber 600 which can abut to other components of a bumper system and/or a vehicle.

While thermoforming is one process to make fascia energy absorber, it will be appreciated by those in ordinary skill in the art that other suitable forming techniques may be used within the scope of the present invention. For example, other processes that may be used can include injection molding, compression molding, extrusion compress, water assist, pressure molding, well molding and rotational molding for example.

In another example embodiment, the fascia energy absorber described herein can be made in stages. For example, the process for making the fascia energy absorber can have three stages within an apparatus that is triangular in shape, for example. The process can begin at a first station in which a polymer sheet is loaded unto clamps of molding thermoforming molding apparatus. The polymer sheet, or in a twin thermoforming operation two polymer sheets, can be loaded unto the clamps of the molding apparatus. Next, the apparatus can be rotated for example in an approximately 120 degrees to advance the sheet to the subsequent adjacent station of the thermoforming apparatus. Therefore, clamps and thermoplastic sheet are moved to the second position that includes an oven for heating the polymer. Then the polymer sheet can be moved to a third thermoforming station which can be equipped with a mold core or a mold cavity or both. In this third stage, the vacuum is applied and air pressure is blown to force the polymer sheet against the mold core or mold cavity.

Therefore in a continuous process, at least a portion of each of the steps of the loading, heating, forming, and joining, is carried out simultaneously. At the first station, a polymer sheet of a first material is loaded onto the clamps, at the second station the polymer is heated, at the third station a gas, for example, air, is blown against the polymer sheet to form an outer member and/or a inner member. At the third station or at an additional fourth station the outer member and the inner member are joined to produce a fascia energy absorber having an outer member of a first material composition and inner member of a second material composition which can be the same or different than the first material composition.

Also, in many continuous processes, the ejection stage of the process is the shortest. Therefore, in the process of the present invention described above the ejection station, at which product is ejected from the mold is the same station as the loading station, at which polymer sheet is loaded for the next cycle. That is, the fascia energy absorber produced from the previous cycle can be ejected and new polymer sheet can be loaded to start the next cycle, at the "eject-load station," in less time than it takes to complete the heating or the forming steps of the second and third stages, respectfully. As one example, the combined ejecting and loading time is equal to or less than the time for each of the heating and forming steps.

Therefore, in one embodiment the process includes: moving at least a first polymer sheet to a position previously occupied by at least a second polymer sheet at the second station after heating the at least second polymer sheet; moving the at least second polymer sheet from the second station to a position previously occupied by at least a third polymer sheet at the third station after forming the at least third polymer sheet to produce a formed polymer unit which is at least one of an outer member, an inner member, and a fascia energy absorber.

While embodiments of the invention have been described, it would be understood by those skilled in the art that various changes may be made and equivalence may be substituted for the energy absorber or system thereof without departing from the scope of the invention. For example, although example embodiments discussed above pertain to vehicles, it should be understood that several other applications may find use of the fascia energy absorber. Also, several different polymers may be used. Many modifications may be made to adapt a particular situation of material to the teachings of the invention without departing from the essential scope thereof. Therefore, it is intended that the invention not be limited to particular embodiments, but that the invention will include all embodiments falling within the scope of the pending claims.

We claim:
1. A fascia energy absorber comprising:
an outer polymer member having at least a portion which is curved; and
an inner member comprising a base and a plurality of crush lobes, and
wherein at least one of the plurality of crush lobes comprises a projected wall spaced a distance from the base, and at least one sidewall which extends from the base to the projected wall of the crush lobe; and wherein the inner member has an external surface located between an internal surface of the inner member and the outer polymer member;

wherein the outer polymer member has an inner surface located between an outer surface of the outer polymer member and the inner member;

wherein the inner member external surface is joined to the outer polymer member inner surface;

wherein at least a first of the plurality of crush lobes is spaced apart from a second of the plurality of crush lobes and separated by a portion of the base; and wherein at least one of the inner member and the outer polymer member has a thickness that is 0.1 millimeters to 2 millimeters.

2. The fascia energy absorber of claim 1, wherein the outer polymer member and the inner member are thermoformed components of the fascia energy absorber.

3. The fascia energy absorber of claim 1, wherein the base of the inner member contacts the outer member and the projected wall of the inner member is spaced a distance from the outer polymer member.

4. The fascia energy absorber of claim 1, wherein the projected wall of the inner member contacts the outer polymer member.

5. The fascia energy absorber of claim 1, wherein the outer polymer member substantially envelops the inner member.

6. The fascia energy absorber of claim 1, wherein at least one of the plurality of crush lobes is corrugated.

7. The fascia energy absorber of claim 1, wherein at least one of the plurality of crush lobes has a transverse width and a height, and the height of the crush lobe varies along the transverse width.

8. The fascia energy absorber of claim 1, wherein the projected walls of at least two of the plurality of crush lobes extends substantially along the same plane.

9. The fascia energy absorber of claim 1, wherein the projected wall of each of the plurality of crush lobes extends substantially along the same plane.

10. The fascia energy absorber of claim 1, wherein the at least one sidewall of the at least one crush lobe is oriented at an angle relative to the projected wall, wherein the angle ranges from 90 degrees to 145 degrees.

11. The fascia energy absorber of claim 1, wherein the wall thickness of the at least one sidewall of at least one of the plurality of the crush lobes is at least as great as 50% of the thickness of the base.

12. The fascia energy absorber of claim 1, wherein the wall thickness of the at least one sidewall of at least one of the plurality of the crush lobes is at least as great as 80% of the thickness of the base.

13. The fascia energy absorber of claim 1, wherein the distance between the projected wall and the base of at least one of the plurality of the crush lobes ranges from 25 to 75 millimeters.

14. The fascia energy absorber of claim 1, wherein the outer polymer member has at least one lip proximate to an edge of the outer polymer member.

15. The fascia energy absorber of claim 1, wherein at least a portion of the base of the inner member has a contoured surface that extends in at least two different directions.

16. The fascia energy absorber of claim 1, wherein at least one of the inner member and outer polymer member comprises a multi-layer of at least two different material compositions.

17. The fascia energy absorber of claim 1, wherein the inner member and outer polymer member comprises different material composition.

18. The fascia energy absorber of claim 1, wherein the inner member and the outer polymer member comprise a thermoplastic material.

19. The fascia energy absorber of claim 1, wherein the inner member and the outer polymer member each comprise a thermoplastic material selected from polyester, polycarbonate, polyolefin or blends thereof.

20. The fascia energy absorber of claim 1, wherein the inner member is joined to the outer member by an element selected from the group consisting of an adhesive, a solder joint, a fastener, and a screw.

21. The fascia energy absorber of claim 1, wherein the inner member is joined to the outer member without fasteners.

22. The fascia energy absorber of claim 1, wherein the outer member is the outermost member of the fascia energy absorber.

23. The fascia energy absorber of claim 1, wherein the inner member is directly joined to the outer member to form a unitary structure.

24. The fascia energy absorber of claim 1, wherein the inner member and outer member form a closed box-like cross-section.

25. A bumper system comprising:
a bumper beam; and
a fascia energy absorber, comprising
an outer member having at least a portion which is curved; and
an inner member comprising a base and a plurality of crush lobes, and
wherein at least one of the plurality of crush lobes comprises a projected wall spaced a distance from the base, and at least one sidewall which extends from the base to the projected wall of the crush lobe; and
wherein the inner member has an external surface located between an internal surface of the inner member and the outer member;
wherein the outer member has an inner surface located between an outer surface of the outer member and the inner member;
wherein the inner member external surface is joined to the outer member inner surface;
wherein at least a first of the plurality of crush lobes is spaced apart from a second of the plurality of crush lobes and separated by a portion of the base;
wherein at least one of the inner member and the outer member has a thickness that is 0.1 millimeters to 2 millimeters.

26. The bumper system of claim 25, wherein the base of the inner member contacts the bumper beam and the base comprises a contoured surface that contacts the bumper beam in at least two different directions.

27. A fascia energy absorber comprising:
a thermoformed outer member having at least a portion which is curved; and
a thermoformed inner member joined to the outer member wherein the inner member comprises a base and a plurality of crush lobes which extend from the base; and
wherein at least one of the plurality of crush lobes comprises a projected wall spaced a distance from the base and at least one sidewall which extends from the base to the projected wall of the crush lobe, and wherein the at least one sidewall has a thickness which is at least as great as 60% of the thickness of the base; and
wherein the inner member has an external surface located between an internal surface of the inner member and the outer member;

wherein the outer member has an inner surface located between an outer surface of the outer member and the inner member;

wherein the inner member external surface is joined to the outer member inner surface in at least one location without the use of a fastener;

wherein at least one of the inner member and the outer member has a thickness that is 0.1 millimeters to 2 millimeters.

28. The fascia energy absorber of claim 27, wherein at least a first one of the plurality of crush lobes is spaced apart from a second one of the plurality of crush lobes and separated by a portion of the base.

29. The fascia energy absorber of claim 27, wherein the inner member and outer member form a closed box-like cross-section.

30. A bumper system comprising:
a bumper beam; and
the fascia energy absorber of claim 27.

31. A fascia energy absorber comprising:
an outer member having at least a portion which is curved; and
an inner member joined to the outer member wherein the inner member comprises a base and a plurality of crush lobes, and
wherein the inner member can slide along a bumper beam; and
wherein at least one of the plurality of crush lobes comprises a projected wall spaced a distance from the base, and at least one sidewall which extends from the base to the projected wall of the crush lobe;
wherein the fascia energy absorber is a unitary structure that is designed to only abut the bumper beam; and
wherein at least one of the inner member and the outer member has a thickness that is 0.1 millimeters to 2 millimeters.

32. A bumper system comprising:
a bumper beam; and
a fascia energy absorber comprising
an outer member having at least a portion which is curved; and
an inner member joined to the outer member forming a unitary structure;
wherein the inner member comprises a base and a plurality of crush lobes, and
wherein at least one of the plurality of crush lobes comprises a projected wall spaced a distance from the base, and at least one sidewall which extends from the base to the projected wall of the crush lobe; and
wherein at least one of the inner member and the outer member has a thickness that is 0.1 millimeters to 2 millimeters; and
wherein the unitary structure only abuts the bumper beam.

33. A fascia energy absorber comprising:
an outer member having at least a portion which is curved; and
an inner member having a base and a plurality of crush lobes, and
wherein at least one of the plurality of crush lobes comprises a projected wall spaced a distance from the base, and at least one sidewall which extends from the base to the projected wall of the crush lobe;
wherein the inner member has an inner member external surface located between an inner member internal surface and the outer member;
wherein the outer member has an outer member inner surface located between an outer member outer surface and the inner member;
wherein the inner member external surface is joined to the outer member inner surface and wherein the inner member can slide along a bumper beam;
wherein the fascia energy absorber forms a unitary structure that is attachable to a vehicle component located adjacent to a bumper beam; and
wherein at least one of the inner member and the outer member has a thickness that is 0.1 millimeters to 2 millimeters.

34. The bumper system of claim 32, wherein the unitary structure is adjacent but not attached to the bumper beam.

* * * * *